United States Patent [19]

Arakawa et al.

[11] 4,322,334

[45] Mar. 30, 1982

[54] LOW SHRINKAGE UNSATURATED POLYESTER RESIN COMPOSITIONS

[75] Inventors: Kouji Arakawa; Kanemasa Nomaguchi; Etsuji Iwami, all of Hitachi, Japan

[73] Assignee: Hitachi Chemical Company, Ltd., Tokyo, Japan

[21] Appl. No.: 100,049

[22] Filed: Dec. 4, 1979

[30] Foreign Application Priority Data

Dec. 13, 1978 [JP] Japan .................................. 53-154750

[51] Int. Cl.³ ........................ C08L 67/00; C08L 67/02
[52] U.S. Cl. .................................... 523/512; 525/165; 525/169; 525/171; 525/176; 525/177; 523/514; 523/516; 523/521; 523/523
[58] Field of Search ............... 525/165, 176, 169, 171, 525/177; 260/40 R

[56] References Cited

U.S. PATENT DOCUMENTS 3,489,707  1/1970  Fry ..................................... 260/40 R

FOREIGN PATENT DOCUMENTS 560003  3/1958  Canada .............................. 525/165

Primary Examiner—J. Ziegler
Attorney, Agent, or Firm—Frishauf, Holtz, Goodman & Woodward

[57] ABSTRACT

Unsaturated polyester resin compositions that have a low shrinking property, and at the same time, an enough strength are provided. The compositions comprises (1) 30–70 parts by weight of an unsaturated polyester obtained by reacting terephthalic acid and/or isophthalic acid and one or more of unsaturated acids selected from the group consisting of maleic anhydride, maleic acid and fumaric acid, with a glycol, and having the unsaturation degree of 1.5–5.0 and the acid value of 18–40, (2) 70–30 parts by weight of $\alpha,\beta$-ethylenically unsaturated monomer, and (3) 5–30 parts by weight of a thermoplastic resin having the number average molecular weight of 5,000–500,000.

8 Claims, No Drawings

LOW SHRINKAGE UNSATURATED POLYESTER RESIN COMPOSITIONS

BACKGROUND OF THE INVENTION

The invention relates to unsaturated polyester resins having a low volume shrinking property upon curing.

Unsaturated polyester resins have a high shrinkage rate upon curing, amounting to 7-11% of volume shrinkage.

Molded articles formed from an unsaturated polyester resin, which is admixed and blended with a glass fibre or a filler such as calcium carbonate, and press-molded or injection-molded, tend to be unsatisfactory due to distortion, cracks, sink marks or blooming of the glass fibre. Such phenomena are often ascribed to the shrinkage of the unsaturated polyester resin upon curing.

In order to solve the problems, there has heretofore been suggested to decrease the shrinkage of resin compositions upon curing by using a highly unsaturated polyester resin in combination with a thermoplastic resin such as vinyl polymers, e.g. polystyrene or polymethyl methacrylate, or saturated polyester resins, as disclosed in Japanese Patent Published Specification No. 46-41709. It is certainly possible to decrease the shrinkage rate of shaped articles by using a highly unsaturated polyester resin and by exerting fully the shrinkage-decreasing effect of a thermoplastic resin. On the other hand, however, the strength of shaped articles decreases generally by incorporation of a thermoplastic resin, down to about 70-80% when compared with ones containing no plastic resin. Further, the strength of unsaturated polyester resin itself, as well as its tenacity, decrease due to the fact that a highly unsaturated resin, in which more than 70 molar percent of acid component are unsaturated acid like maleic anhydride, has to be used.

BRIEF EXPLANATION OF THE INVENTION

The invention is, therefore, to provide low shrinkage unsaturated polyester resin compositions having a higher strength than known shaped articles, even when a thermoplastic resin is incorporated therein. The invention is related to low shrinkage unsaturated polyester resin compositions which comprises (1) 30-70 parts by weight of an unsaturated polyester, whose unsaturation degree (i.e. moles of unsaturated acid contained in 1,000 g. of unsaturated polyester) is 1.5-5.0 and the acid value is 18-40, obtained by reacting terephthalic acid and/or isophthalic acid, and one or more of unsaturated acids selected from the group consisting of maleic anhydride, maleic acid and fumaric acid, with a glycol, (2) 70-30 parts by weight of an $\alpha,\beta$-ethylenically unsaturated monomer, and (3) 5-30 parts by weight of a thermoplastic resin whose number average molecular weight is 5,000-500,000.

The invention is, therefore, to provide low shrinkage unsaturated polyester resin compositions which show a small decrease in strength by using the above-mentioned unsaturated polyester obtained by reacting an acid component comprising terephthalic acid and/or isophthalic acid and one or more of unsaturated acids selected from the group consisting of maleic anhydride, maleic acid and fumaric acid, with a glycol component, in combination with the above-mentioned thermoplastic resin.

DETAILED DESCRIPTION OF PREFERRED EMBODIMENTS OF THE INVENTION

The unsaturated polyesters of the invention may be obtained by using, as the acid components, either or both of terephthalic acid and isophthalic acid, and one or more of maleic anhydride, maleic acid and fumaric acid; and as the glycol component, ethylene glycol, diethylene glycol, propylene glycol, dipropylene glycol, butylene glycol, neopentyl glycol, hexylene glycol, hydrogenated bisphenol A, 2,2'-di(4-hydroxypropoxyphenyl)propane, 2,2'-di(4-hydroxyethoxyphenyl)propane, or the like.

The unsaturation degree, i.e. moles of unsaturated acid contained in 1,000 g. of unsaturated polyester, should be confined to 1.5-5.0. The unsaturation degree of less than 1.5 will give insufficient shrinkage-decreasing effect of thermoplastic resin, whereas that of more than 5.0 will no longer improve the strength of unsaturated polyester resins due to the lower content of saturated acid (i.e. terephthalic acid and/or isophthalic acid). Use of terephthalic acid and/or isophthalic acid as the saturated acid will give the low shrinkage effect in full.

The acid value of unsaturated polyester should be 18-40. An acid value of less than 18 will give an insufficient shrinkage-decreasing effect, whereas that of more than 40 will no longer improve the strength of unsaturated polyester resin.

$\alpha,\beta$-Ethylenically unsaturated monomers to be used in the invention include styrene, vinyltoluene, divinylbenzene and diallyl phthalate.

Thermoplastic resins to be used in the invention should be those having the number average molecular weight of 5,000-500,000. Such resins include polystyrene homopolymers, plural copolymers comprising, e.g. styrenemethacrylic ester-butadiene-acrylonitrile-maleic acid, polymethyl methacrylate, polyvinyl acetate, vinyl chloride-vinyl acetate copolymers, and ethylene-vinyl acetate copolymers.

These polymers may contain carboxyl groups in the side chain.

As mentioned above, the number average molecular weight of the polymers should be 5,000-500,000. That of less than 5,000 will give an insufficient shrinkage-decreasing effect, whereas that of more than 500,000 will damage the compatibility with the unsaturated resins severely, thus impairing the appearance of cured articles and making the strength distribution variable.

In this invention, the amounts of unsaturated polyester and of $\alpha,\beta$-ethylenically unsaturated monomer should be 30-70 parts by weight and 70-30 parts by weight, respectively.

Use of less than 30 parts by weight of unsaturated polyester will cause a high shrinkage upon curing ascribed to the $\alpha,\beta$-ethylenically unsaturated monomer, that will not be compensated by the use of a thermoplastic resin, whereas use of more than 70 parts by weight of unsaturated polyester will decrease the amount of heat generated upon curing and impair the shrinkage-decreasing effect of the thermoplastic resin.

The total amount of unsaturated polyester and $\alpha,\beta$-ethylenically unsaturated monomer should be 100 parts by weight.

The amount of thermoplastic resin should be confined to 5-30 parts by weight. Use of less than 5 parts by weight will give an insufficient shrinkage-decreasing effect, whereas use of more than 30 parts by weight will give an insufficient strength of shaped articles, although the shrinkage-decreasing effect may be attained.

The low shrinkage unsaturated polyester resin compositions of the invention may be cured with a hardener, such as methyl ethyl ketone peroxide, t-butyl perbenzoate and benzoyl peroxide.

The resin compositions of the invention may contain, if necessary, fillers such as calcium carbonate, talc, silica sand, silicic acid, aluminum hydroxide and barium sulfate. They may also contain reinforcements such as glass fibre, carbon fibre and organic fibres. Furthermore, they may contain pigments or plasticizers, depending on the objects they are used for.

By using the low shrinkage unsaturated polyester resin compositions of the invention, it becomes possible to prepare shaped articles having a low shrinkage rate upon shaping, high strength, and a good, smooth surface.

The invention is further explained by the following non-limiting examples.

EXAMPLE 1

(1) An unsaturated polyester obtained from 1.10 moles of propylene glycol, 0.5 mole of maleic anhydride and 0.5 mole of terephthalic acid, and having the acid value of 30 and the unsaturation degree of 2.7 was made into a 70% by weight styrene solution (A).

(2) An unsaturated polyester obtained from 1.10 moles of propylene glycol and 1.0 mole of maleic anhydride, and having the acid value of 30 and the unsaturation degree of 6.1 was made into a 70% by weight styrene solution (B).

(3) A polystyrene having the number average molecular weight of 100,000 was dissolved in styrene to make a 50% by weight styrene solution (C).

Each resin solution prepared as above was admixed with an inorganic filler to make a bulk-molding compound, and the characteristics thereof were determined. The results are shown in Table 1.

TABLE 1

| Material | Example 1 | Comparison 1 | Comparison 2 |
|---|---|---|---|
| unsaturated polyester resin | solution (A) 70 | solution (B) 70 | solution (B) 100 |
| solution (C) | 30 | 30 | — |
| t-butyl peroxybenzoate | 1 | 1 | 1 |
| calcium carbonate | 150 | 150 | 150 |
| zinc stearate | 2 | 2 | 2 |
| magnesium oxide | 2 | 2 | 2 |
| ¼ inch glass fibre | 40 | 40 | 40 |
| characteristics* shrinkage rate upon shaping** (%) | +0.03 | +0.03 | −0.8 |
| bending strength (kg/mm²) 23° C. | 8.0 | 5.0 | 8.0 |
| 100° C. | 3.5 | 1.5 | 3.5 |

*shaping conditions:
temperature, 140° C.
pressure, 30 kg/cm²
period, 3 minutes
**according to Japanese Industrial Standard K 6911

As will be evident from Table 1, the composition for shaping in which the resin composition of the invention was used shows the shrinkage rate upon shaping comparable to that when a highly unsaturated resin was used, and the strength comparable to that when no shrinkage-decreasing material was used.

EXAMPLE 2

(1) An unsaturated polyester obtained from 0.50 mole of propylene glycol, 0.55 mole of neopentyl glycol, 0.5 mole of maleic anhydride and 0.50 mole of terephthalic acid, and having the acid value of 30 and the unsaturation degree of 2.5 was made into a 70% by weight styrene solution (D).

(2) An unsaturated polyester obtained from 0.50 mole of propylene glycol, 0.55 mole of neopentyl glycol and 1.0 mole of maleic anhydride, and having the acid value of 30 and the unsaturation degree of 5.7 was made into a 70% by weight styrene solution (E).

(3) 30 parts of polyvinyl acetate having the number average molecular weight of 50,000 were dissolved into 70 parts of styrene monomer to give a styrene solution of polyvinyl acetate (F).

Each solution was admixed with an inorganic filler to make a bulk-molding compound and the characteristics thereof were determined. The results are shown in Table 2.

TABLE 2

| Material | Example 2 | Comparison 3 | Comparison 4 |
|---|---|---|---|
| unsaturated polyester resin | solution (D) 70 | solution (E) 70 | solution (E) 100 |
| solution (F) | 30 | 30 | — |
| t-butyl peroxybenzoate | 1 | 1 | 1 |
| calcium carbonate | 150 | 150 | 150 |
| zinc stearate | 2 | 2 | 2 |
| magnesium oxide | 2 | 2 | 2 |
| ¼ inch glass fibre | 40 | 40 | 40 |
| characteristics* shrinkage rate upon shaping** (%) | +0.07 | +0.07 | −0.5 |
| bending strength (kg/mm²) 23° C. | 9.0 | 5.0 | 9.0 |
| 100° C. | 5.0 | 2.0 | 4.8 |

*shaping conditions:
temperature, 140° C.
pressure, 30 kg/cm²
period, 3 minutes
**according to Japanese Industrial Standard K 6911

As will be evident from Table 2, the composition for shaping in which the resin composition of the invention was used shows the shrinkage rate upon shaping comparable to that when a highly unsaturated resin was used, and the strength comparable to that when no solution (F) was used (Comparison 4).

What is claimed is:

1. A low shrinkage unsaturated polyester resin molding composition which consists essentially of component (1) 30–70 parts by weight of an unsaturated polyester obtained by reacting (i) at least one acid selected from the group consisting of terephthalic acid and isophthalic acid and (ii) at least one unsaturated acid selected from the group consisting of maleic anhydride, maleic acid and fumaric acid, with a glycol, said unsaturated polyester having an unsaturated degree (moles of the unsaturated acids in 1,000 g. of the unsaturated polyester) of 1.5–5.0 and an acid value of 18–40; component (2) 70–30 parts by weight of an $\alpha,\beta$-ethylenically unsaturated monomer, said components (1) and (2) totaling 100 parts by weight; and component (3) 5–30 parts by weight of a thermoplastic resin having the number average molecular weight of 5,000–500,000.

2. The composition of claim 1 wherein said glycol is selected from the group consisting of ethylene glycol, diethylene glycol, propylene glycol, dipropylene glycol, butylene glycol, neopentyl glycol, hexylene glycol, hydrogenated bisphenol A, 2,2'-di(4-hydroxypropoxyphenyl)propane and 2,2'-di(4-hydroxyethoxyphenyl)propane.

3. The composition of claim 1 or claim 2 wherein said $\alpha,\beta$-ethylenically unsaturated monomer is selected from the group consisting of styrene, vinyltoluene, divinylbenzene and diallyl phthalate.

4. The composition of claim 3 wherein said thermoplastic resin is at least one resin selected from the group consisting of polystyrene homopolymers, styrene-methacrylic ester-butadiene-acrylonitrile-maleic acid copolymer, polymethyl methacrylate, polyvinyl acetate, vinyl chloride-vinyl acetate copolymers, and ethylene-vinyl acetate copolymers.

5. The composition of claim 1 wherein said thermoplastic resin is at least one resin selected from the group consisting of polystyrene homopolymers, styrene-methacrylic ester-butadiene-acrylonitrile-maleic acid copolymer, polyvinyl acetate, vinyl chloride-vinyl acetate copolymers, and ethylene-vinyl acetate copolymers.

6. The composition of any one of claims 1 or 2, which also contains at least one adjuvant selected from the group consisting of calcium carbonate, talc, silica sand, silicic acid, aluminum hydroxide, barium sulfate, glass fibre, carbon fibre, organic fibre, pigments and plasticizers.

7. The composition of claim 3 which also contains at least one adjuvant selected from the group consisting of calcium carbonate, talc, silica sand, silicic acid, aluminum hydroxide, barium sulfate, glass fibre, carbon fibre, organic fibre, pigments and plasticizers.

8. The composition of claim 4 which also contains at least one adjuvant selected from the group consisting of calcium carbonate, talc, silica sand, silicic acid, aluminum hydroxide, barium sulfate, glass fibre, carbon fibre, organic fibre, pigments and plasticizers.

* * * * *